United States Patent [19]
Dzus, Jr.

[11] 3,765,265
[45] Oct. 16, 1973

[54] CLUTCH STOP
[75] Inventor: Theodore Dzus, Jr., West Islip, N.Y.
[73] Assignee: Dzus Fastener Co., Inc., West Islip, N.Y.
[22] Filed: Feb. 9, 1972
[21] Appl. No.: 224,828

[52] U.S. Cl. .................................. 74/526, 74/560
[51] Int. Cl. ............................................ G05g 1/04
[58] Field of Search ................... 74/526, 512, 560; 192/99 S, 109 R

[56] References Cited
UNITED STATES PATENTS
2,251,087  7/1941  Vincent ............................. 74/526
2,332,064  10/1943  Duffy ................................. 74/526

Primary Examiner—Milton Kaufman
Assistant Examiner—Frank H. McKenzie, Jr.
Attorney—David S. Kane et al.

[57] ABSTRACT

An adjustable stop for a clutch pedal of a motor vehicle. A stop plate engageable with the fixed wall of the motor vehicle is provided and a bracket mounted to the stop plate which is engageable with the clutch pedal. The stop plate and the bracket are fastened to either the clutch pedal or the fixed wall. Adjustable means are provided on the bracket and the stop plate to limit the travel distance of the clutch pedal with respect to the fixed wall of the motor vehicle thereby minimizing the danger of excessive clutch pedal movement during the shifting operation.

7 Claims, 4 Drawing Figures

PATENTED OCT 16 1973  3,765,265

CLUTCH STOP

BACKGROUND OF THE INVENTION

A common problem occurring in operation of standard transmission motor vehicles is in connection with movement of the clutch pedal during the shifting operation from gear to gear during the driving procedure. The tendency is to depress the clutch pedal to a greater degree to assure engagement of the clutch. This produces a condition commonly termed as "over clutch." The clutch is engaged for too long a period of time since the travel distance of the clutch is so great that it takes too long a period of time for the clutch to disengage. Wear and tear on the motor is thus increased and a dangerous condition of unnecessarily high revolutions is produced.

An additional problem that might occur is that by depressing the clutch pedal entirely to its full extent and into engagement with the floor board or fixed wall of the motor vehicle could produce sticking of the clutch to the floor. This is particularly possible with certain types of clutches such as diaphragm clutches.

With the above considerations in mind, it is readily apparent that it would be extremely advantageous in driving motor vehicles with standard transmissions to have an adjustment for the clutch pedal so that its travel distance is closely controlled. By limiting the travel distance of the clutch pedal, it would no longer be necessary or possible to depress the clutch pedal all the way to the floor and create a sticking problem. Additionally, with a fixed travel distance for the clutch pedal the exact moment of engagement of the clutch can be determined so that the problem of over clutch does not occur.

SUMMARY OF THE INVENTION

With the above thoughts in mind, it is among the primary objectives of this invention to provide a clutch stop which will attach to either the floor board or the clutch pedal and which will limit the travel distance of the clutch pedal to provide maximum efficiency. The clutch stop is adjustable with respect to distance and angle so that it is adaptable to virtually any type of arrangement between clutch pedal and the floor board in a motor vehicle. The clutch stop is portable, low cost, economical to produce and can be easily mounted and dismounted with respect to a specific motor vehicle.

In summary, an adjustable stop is provided for a clutch pedal of a motor vehicle. A stop includes a stop plate engageable with a fixed wall of the motor vehicle and a bracket mounted to the stop plate and engageable with the clutch pedal. The stop plate and bracket combination is mounted to either the clutch pedal or the fixed wall. Adjustable means are on the bracket and stop plate to limit the travel distance of the clutch pedal with respect to the fixed wall of the motor vehicle to minimize the danger of excessive clutch pedal movement during shifting operation.

With the above objectives in mind, reference is had to the attached drawings.

BRIEF DESCRIPTION OF TTHE PREFERRED EMBODIMENT

Figure 1:
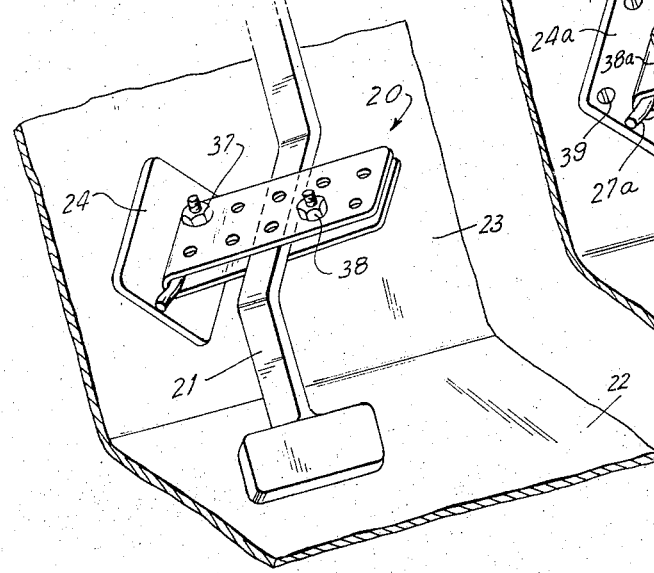
FIG. 1 is a fragmentary perspective view of the clutch stop of the invention mounted to a clutch pedal of a motor vehicle.
Figure 2:
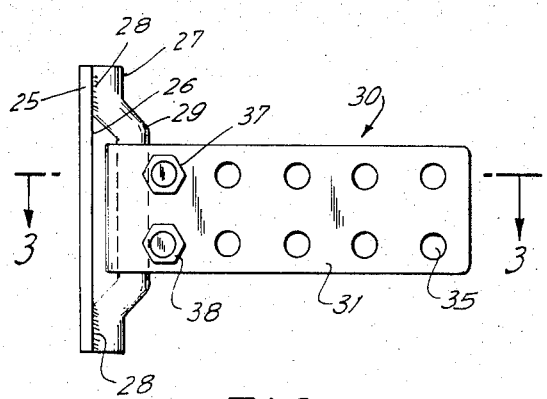
FIG. 2 is a side elevation view of the clutch stop of the invention.
Figure 3:
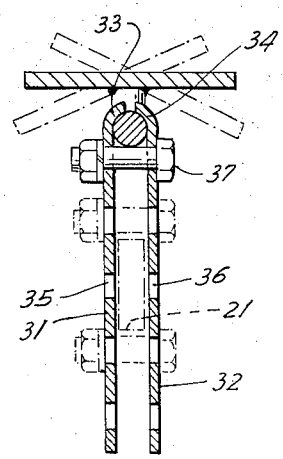
FIG. 3 is a sectional top view thereof taken along the plane of line 3—3 of FIG. 2.

FIGS. 1–3 show one embodiment of the clutch stop 20 mounted on a clutch pedal 21 of a motor vehicle. As shown in FIG. 1, the pedal 21 is shown in a common location with respect to a floor board 22 and the fixed wall 23 of a motor vehicle such as an automobile.

A clutch stop includes a rectangular shaped stop plate 24 with a forward surface 25 for engagement with the fixed wall and a rear surface 26. Mounted on the rear surface 26 is a loop 27. Each end 28 of loop 27 is mounted in fixed position to the rear surface 26 of stop plate 24. This interengagement between the handle and the stop plate may be made in any convenient manner such as by welding as shown or the handle may be integral with the stop plate 24. Loop 27 is curved in shape so that the central portion 29 is spaced from rear surface 26 of plate 24. This permits the bar shaped central portion 29 of loop 27 to be engaged by U-shaped bracket 30. As shown particularly in FIG. 3, U-shaped bracket 30 is primarily constructed of a pair of opposing substantially parallel wall members 31 and 32. The wall members are substantially rectangular in configuration with the exception of their rear end portions which are curved so as to conform with the bar shaped central portion 29 of loop 27. Curved portion 33 of side wall 31 is directed so that it is directed toward curved portion 34 of side wall 32. Complete interengagement between the curved ends of side walls 31 and 32 would form a continuous U-shaped bracket member 30. However, as shown in FIG. 3 in usual position, the end portions 33 and 34 are spaced somewhat as they are in engagement with central portion 29 of loop 27.

Each of the plates 31 and 32 have two parallel rows of holes extending longitudinally along the side walls as shown, each hole of each row is aligned with a corresponding hole of the adjacent row. In turn, when side walls 31 and 32 are positioned in proper parallel relationship with respect to one another, the hole 35 in side walls 31 are aligned with corresponding hole 36 in side wall 32. A pair of nut and bolt assemblies 37 and 38 are provided for each set of aligned rows of holes. In this manner, the nut and bolt assembly 37 may be shifted to any one of the longitudinal positions in one row of holes while the other nut and bolt assembly 38 may be shifted to anyone of the longitudinal positions provided by the parallel longitudinal row of holes in side walls 31 and 32.

One of the nut and bolt assemblies is designed to regulate the adjustment between plate 24 and bracket 30 while the other nut and bolt assembly is designed to fix the location of clutch stop 20 with respect to clutch pedal 21. In the embodiment shown in FIGS. 1–3, nut and bolt assembly 37 is utilized to fix the angle and position of plate 24 with respect to bracket 30. If nut assembly 37 is loosened, curved portions 33 and 34 are loosened with respect to their engagement to central portion 29 of loop 27. This permits plate 24 to be rotated within a predetermined radius so that flush engagement is enabled between undersurface 25 of plate 24 and fixed wall 23. When the proper angle has been attained, nut assembly 37 is tightened and flush engagement between plate 24 and fixed wall 23 is insured for the particular motor vehicle in which it is mounted.

Clutch pedal 21 is positioned between side walls 31 and 32. The particular location along the longitudinal length of bracket 30 is determined by the positioning of bolt assembly 38. As shown particularly in FIG. 1, when the proper and desired position is decided upon, bolt assembly 38 is located in the aligned openings 35 and 36 which place clutch pedal 21 between assembly 38 and assembly 37. Thereafter, by tightening bolt assembly 38 the free ends of side walls 31 and 32 are deformed and brought closer together. This pinches clutch pedal 21 between the drawn together side walls 31 and 32 and locks it in fixed position. When the clutch pedal is depressed, it can only move a predetermined distance until the undersurface 25 of plate 24 engages with fixed wall 23. The shifting operation can then occur and the pedal can be released to return to its relaxed position with undersurface 25 of plate 24 once again spaced from fixed wall 23.

It is readily apparent that clutch stop 20 can be easily assembled and disassembled with respect to any particular clutch pedal located in a motor vehicle. Disassembly of bolt assembly 38 will free clutch stop 20 from clutch pedal 21. Additionally, if it is desired, disassembly of bolt assembly 37 will completely disassemble clutch stop 20 by permitting bracket 30 to be disassociated from stop plate 24. Reverse activity can readily accomplish reassembly of clutch stop 20 and reengagement of stop 20 with a clutch pedal of another motor vehicle.

As previously discussed, stop 20 permits the travel distance of a clutch pedal to be closely controlled thereby alleviating the danger of the clutch pedal sticking to the floor and additionally alleviating the danger of over clutch. The adjustment can be made with the assembly to permit just enough movement of the clutch pedal for quick and efficient shifting without extraneous mechanical activity. The assembly can be constructed easily and efficiently of a low cost material and, as discussed above, can be readily assembled and disassembled in a short period of time.

Figure 4:
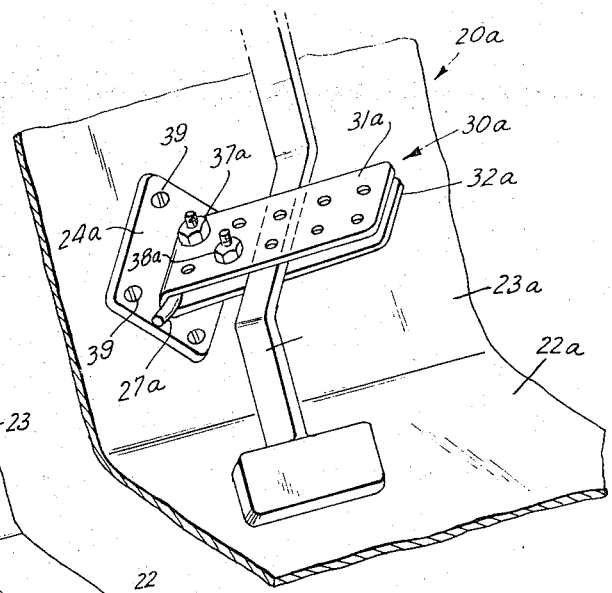
FIG. 4 is a fragmentary perspective view of an alternate embodiment of the clutch stop of the invention.

An alternate embodiment is shown in perspective form in FIG. 4 of the drawing. This embodiment shows the stop plate 24a bolted to the fixed wall by means of bolt assembly 39. The angle of interengagement between bracket 30a and plate 24a is adjusted in a similar manner to the previously discussed embodiment by means of loop 27a and bolt assembly 37a. The difference in operation of the clutch stop of this embodiment lies in that clutch pedal 21a is permitted to move with respect to clutch stop 20a. Its length of travel is controlled by interengagement with bolt assembly 38a. Clutch pedal 21a is guided in its reciprocal travel path between side walls 31a and 32a of bracket 30a. The length of travel of pedal 21a is determined by the positioning of bolt assembly 38a longitudinally along the row of holes in side walls 31a and 32a. The primary advantages discussed above in respect to the initially discussed embodiments are also present when the alternate embodiment is employed.

Thus, the above objectives, among others, are effectively attained.

I claim:

1. An adjustable stop for the clutch pedal of a motor vehicle comprising:
   a stop plate engageable with a fixed wall of the motor vehicle;
   a bracket mounted to the stop plate and engageable with the clutch pedal;
   said stop plate and said bracket mounted to one of said clutch pedal and said fixed wall;
   adjustable means on said bracket and stop plate to limit the travel distance of said clutch pedal with respect to the fixed wall of said motor vehicle so as to minimize the danger of excessive clutch pedal movement during shifting operations;
   said bracket being a U-shaped member having a closed end and an open end with the closed end being fixed to the stop plate;
   the opposing walls of said U-shaped member being substantially parallel and spaced apart so as to receive said clutch pedal therebetween; and
   said adjustable means being adapted to shift the position of said bracket and stop plate with respect to said clutch pedal to thereby adjust the travel distance of said clutch pedal with respect to said fixed wall of the motor vehicle.

2. The invention in accordance with claim 1 wherein said adjustable means includes a plurality of holes in each parallel side wall of the U-shaped bracket with a hole in one side wall aligned with a hole in the other side wall, a locking assembly adapted to pass through each pair of aligned holes and to be removable therefrom so that when said locking assembly is fixed in position in a pair of aligned holes and said clutch pedal is positioned between the walls of the bracket, the locking means will cause the walls of the bracket to engage the clutch pedal and thereby fixing the bracket and stop plate in a predetermined position with respect to said clutch pedal.

3. The invention in accordance with claim 2 wherein said locking means is a nut and bolt assembly whereby the bolt passes through said side walls of the bracket and when said nut is applied thereto said side walls will be deformed to engage with the clutch pedal and retain it in fixed position.

4. The invention in accordance with claim 3 wherein said locking means is adjustable, the closed end of said U-shaped bracket being separable when said adjustable locking means is loosened to permit said stop plate to be rotated within a predetermined radius with respect to said U-shaped bracket to facilitate its desired interengagement with the fixed walls of the motor vehicle, and thereafter when said stop plate has been adjusted for proper interengagement said locking means can be adjusted to retain the stop plate in fixed position with respect to said U-shaped bracket.

5. The invention in accordance with claim 1 wherein said stop plate is normally positioned substantially parallel to the fixed wall of the motor vehicle for engagement therewith, the side of said stop plate remote from the fixed wall of said motor vehicle having a fixed loop thereon, the closed end of said U-shaped bracket having its internal surface in engagement with the internal surface of said loop and locking means on said bracket to retain the fixed relationship between the closed end of said U-shaped bracket and said loop and to position said bracket with the side walls substantially perpendicular to the remote surface of the stop plate.

6. The invention in accordance with claim 1 wherein said U-shaped bracket is a pair of parallel plates being curved at one end thereof.

7. An adjustable stop for the clutch pedal of a motor vehicle comprising:
- a stop plate engageable with a fixed wall of the motor vehicle;
- a bracket mounted to the stop plate and engageable with the clutch pedal;
- said stop plate and said bracket mounted to one of said clutch pedal and said fixed wall;
- adjustable means on said bracket and stop plate to limit the travel distance of said clutch pedal with respect to the fixed wall of said motor vehicle so as to minimize the danger of excessive clutch pedal movement during shifting operations;
- said stop plate being mounted in fixed position with respect to said fixed wall of the motor vehicle;
- the adjustable means being on the bracket to limit the travel of the clutch pedal with respect to the fixed wall of the motor vehicle; and
- a second adjustable means on said bracket to facilitate the proper orientation of said bracket with respect to said stop plate to permit the proper movement of said clutch pedal with respect to the fixed wall of the motor vehicle.

* * * * *